March 24, 1925.

J. F. MONTINE 1,530,785

CARRIER TRUCK

Filed June 28, 1923     3 Sheets-Sheet 1

Inventor
J. F. Montine
Milo B. Stevens
Attorney

March 24, 1925. 1,530,785
J. F. MONTINE
CARRIER TRUCK
Filed June 28, 1923  3 Sheets-Sheet 2

Inventor
J. F. Montine,
By Milo B. Stevens & Co,
Attorney

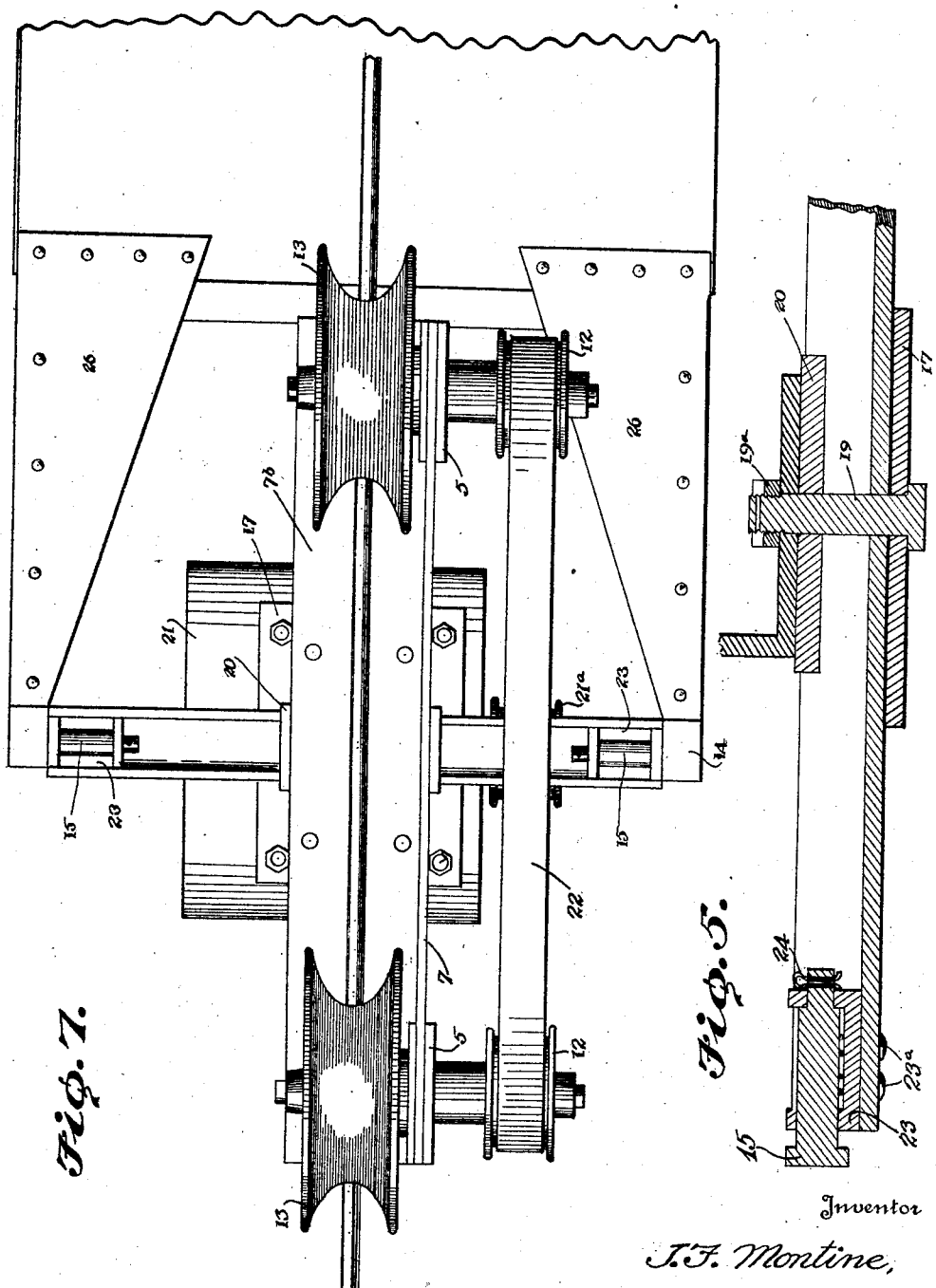

Patented Mar. 24, 1925.

1,530,785

UNITED STATES PATENT OFFICE.

JOSEPH F. MONTINE, OF CHICAGO, ILLINOIS.

CARRIER TRUCK.

Application filed June 28, 1923. Serial No. 648,350.

*To all whom it may concern:*

Be it known that I, JOSEPH F. MONTINE, a citizen of the United States, residing at Chicago, in the county of Cook and State of Illinois, have invented new and useful Improvements in Carrier Trucks, of which the following is a specification.

My present invention relates to carrier trucks employed in connection with aerial tramways for collecting and delivering mails, merchandise and etc. along a route, and is an improvement of the carrier truck of my application Serial Number 583,835 filed August 23, 1922, now Patent 1,464,011, issued August 7, 1923.

An important object of the invention is the provision of a truck of the character set forth which may be used in pairs for supporting a car or receptacle, but which nevertheless may also be used singly for carrying a receptacle of smaller dimensions.

The invention also has for an object to provide a very simple, strong and durable connection between the truck and a receptacle whereby the latter will be attached to the truck for both vertical and horizontal pivotal movement with respect thereto, and whereby the receptacle may be quickly attached or detached from the truck.

A further object of the invention resides in certain novel features of construction wherein an improved bearing for the pulley and traction wheels of the truck is provided for maintaining portions of the truck frame in proper assembled relation.

A still further object of the invention is to furnish a truck of the character set forth which will be of a rigid, light, strong and durable construction obtained without necessitating the use of castings, and which will render the device relatively inexpensive of manufacture.

With the above principal objects in view, and other incidental objects to be developed during the course of the detailed description appearing hereinafter, the invention comprises certain novel features of construction and arrangement of the various parts which will be better understood upon reference to the accompanying drawing forming a part of this specification.

Fig. 5 is a longitudinal sectional view through the bolster and illustrating its vertically pivotal connection with the carrier and its horizontal pivotal connection to the truck;

Fig. 7 is a plan view of Fig. 1.

Figure 1:
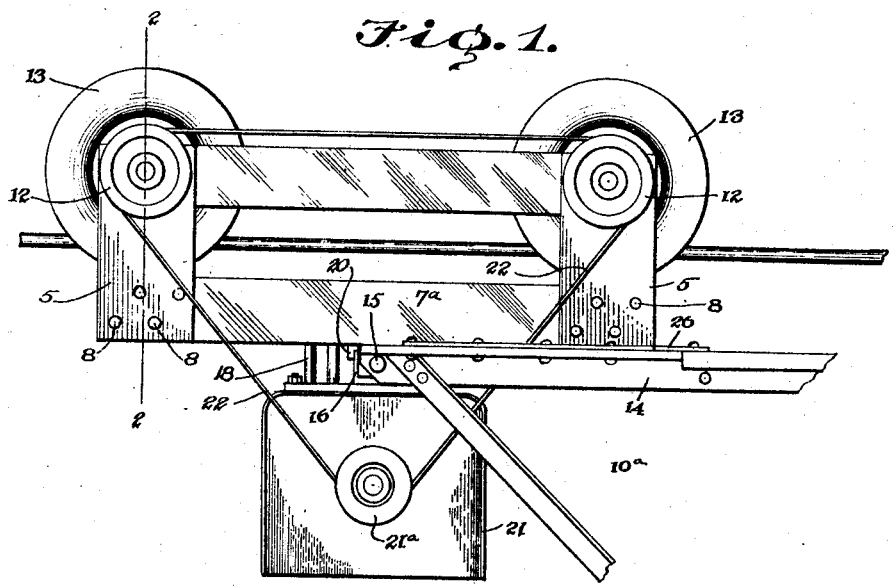
Figure 1 is an elevation of a truck constructed in accordance with my invention, and illustrating the mode of attachment of one form of receptacle thereto.

Referring specifically to the drawings, wherein like reference characters have been used to designate similar parts throughout all views, numeral 5 has been used to denote two pairs of spaced vertical supports, preferably of cold rolled steel which are connected by longitudinally disposed members 7 and 7$^a$ at their upper and lower ends, respectively.

Figure 2:
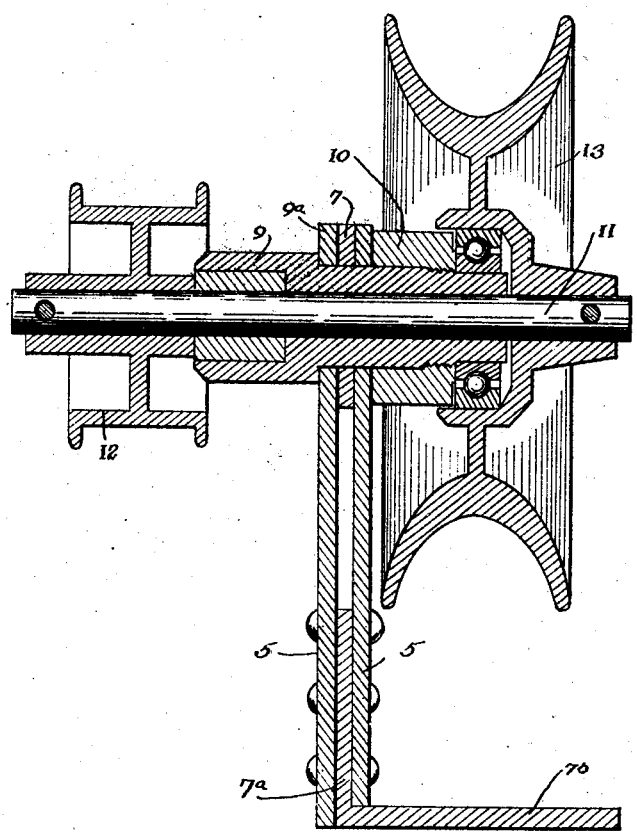
Fig. 2 is a sectional view taken on the line 2—2 of Fig. 1.

The longitudinally disposed member 7$^a$ at the lower end of the pairs of supports 5 is angular in cross section as shown in Fig. 2, the laterally projecting portion 7$^b$ thereof, serving to permit an attachment of a receptacle to the truck as will hereinafter appear. This member 7$^a$ is secured between the pairs of supports 5 by means of rivets 8 or other suitable fasteners. The other longitudinally disposed member 7 at the upper ends of the supports, is however held in position by means of the shoulder 9$^a$ of a journal bearing 9 which clamps upon the outside of the pairs of supports 5 and is effectually held in position by a nut or sleeve 10 which is threaded upon said journal bearing 9 and clamped against the inner face of the supports 5. The shaft 11 carrying the pulley 12 and the traction wheel 13 at its respective ends passes through the journal bearing 9, and since the bearing per se has been covered in a separate application, referred to above, a further description thereof here is unnecessary. It will be apparent from the foregoing that it is unnecessary to rivet or otherwise fasten the longitudinal member 7 between the pairs of upright supports 5. The bearing with its shoulder and threaded sleeve construction will effectually hold the parts in assembled relation, thus saving the expense of riveting or otherwise fastening the parts together. From the foregoing it will be apparent that a very strong and durable frame for the truck will be provided, all parts of the same being of cold rolled flat steel with the exception of the angle member 7ª. By using two pairs of supports 5 in spaced relation as shown in Fig. 2, the framework of the truck will have great rigidity, and in addition durable support for the journal bearing 9 will be provided without the necessity of using single heavy supports 5.

Figure 3:
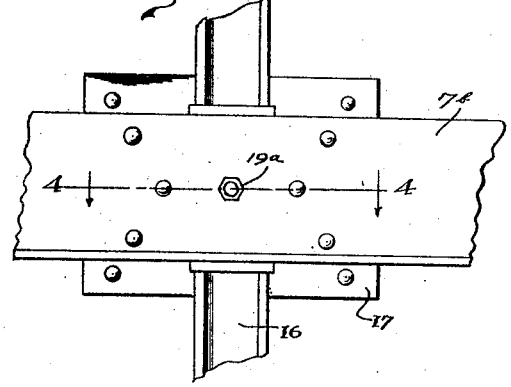
Fig. 3 is a plan view in fragmentary form of a portion of the truck illustrating the horizontally pivotal connection of a receptacle bolster thereto.
Figure 4:
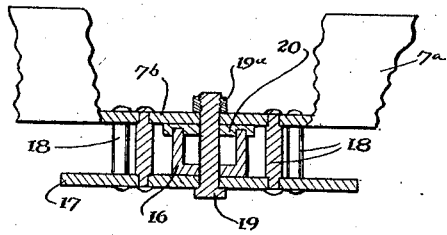
Fig. 4 is a section on the line 4—4 of Fig. 3 looking in the direction of the arrows.

The means for attachment of a carrier receptacle 10 will now be described, reference being had particularly to Figs. 1, 3, and 4. The side walls of the receptacle 10 are each provided with a longitudinal bar 14 transversely apertured at either end to receive a bolt 15 whereby the carrier 10 will be attached to a transverse bolster 16 which will be pivotally attached to the lateral portion 7ᵇ of the longitudinal member 7ª at its medial portions. In the drawings I have illustrated but one end of the receptacle 10, showing its attachment to a truck, but it will be understood of course that the other end will be attached in a similar manner to another truck. One description will suffice for both.

The bolster 16 is supported upon a plate 17 upon the upper face thereof, the plate 17 being attached to the lateral portion 7ᵇ of the longitudinal member 7ª by means of studs, bolts or other suitable fasteners 18. These fastening elements 18 being shouldered at either end so as to maintain the plate 17 in spaced relation from the lateral portion 7ᵇ of the longitudinal member 7ª. The bolster 16 being supported upon the plate 17 as just described, a pivotal connection with the laterally projecting portion 7ᵇ and the bolster is had by means of a bolt 19 inserted through the bolster from the outer face of the plate 17 as shown in Fig. 4 and through the lateral portion 7ᵇ to receive a cap 19ª. The bolster 16 is of channeled construction as shown in Fig. 4, and in order to prevent any twisting of the bolster as it is swung horizontally on the pivoted pin 19, I have provided a wear plate 20 which is provided with longitudinal grooves to receive the edges of the channeled bolster and form an upper bearing portion for the pivot bolt 19. This wear plate will of course swing with the bolster and will relieve the strain from the bearing in the bottom of the bolster in case of any torsion or twisting movement. Upon reference to Fig. 3 it will be noted that the fastening elements 18 for securing the plate 17 to the lateral portion 7ᵇ are so arranged in two sets of spaced V-shaped design to permit free swinging movement of the bolster as the truck goes around a curve.

The plate 17 is also adapted to removably carry a housing 21 for a suitable motor whereby power is transmitted to drive pulleys 12 by means of a motor pulley 21ª as shown in Fig. 1.

The bolster 16 at either end is provided with a short transversely disposed channel plate 23 as shown in Fig. 5, which is rigidly secured to the bottom of the bolster by means of rivets or other suitable fasteners 23ª. The walls of the channel plate 23 are apertured to receive the pivot bolts 15 which are insertible through the openings in the ends of the bars 14 of the carrier 10ª as hereinbefore stated, the inner end of the bolt 15 being transversely apertured to receive a cotter pin or other suitable fastener 24.

Figure 6:
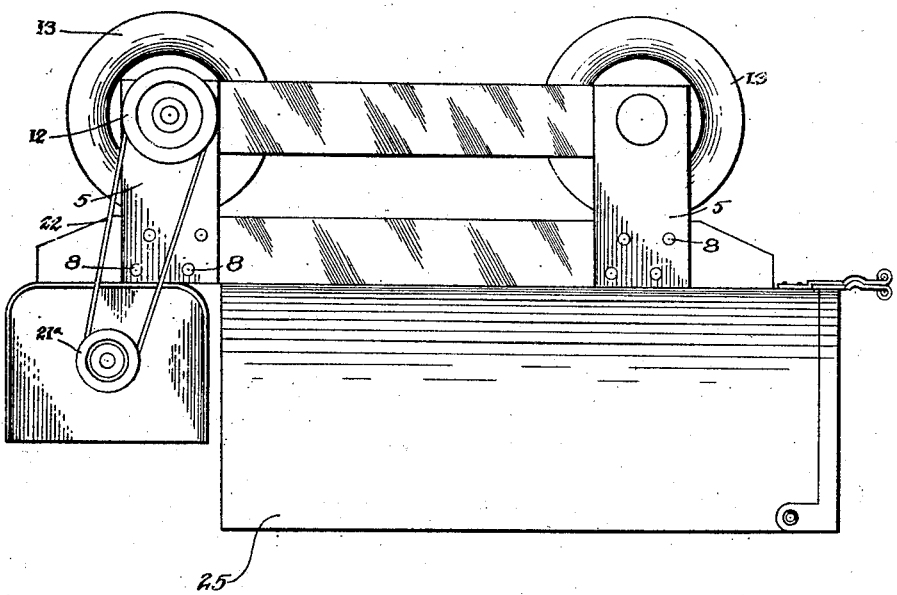
Fig. 6 is an elevation illustrating the application of a receptacle to a single truck.

From the foregoing description read in connection with the accompanying drawing it will be evident that a very strong and durable connection has been provided between the receptacle or carrier and the truck. This connection permits for both lateral and vertical pivotal movement of the receptacle with reference to the truck so as not to interfere with the same in negotiating turns or grades. This construction also readily permits detachment of the carrier and other associated elements from the truck proper without weakening the construction of the truck, thus permitting the truck to be used as a unit for carrying a small receptacle 25 as shown in Fig. 6. In this embodiment of the invention, the motor housing 21 is attached to the forward portion of the truck the bolt 22ª of the motor housing 21 passing through the apertures in the lateral flange 7ᵇ of the longitudinal member 7ª. By moving the motor to this position, sufficient space is left beneath the lateral flange 7ᵇ to attach the receptacle 25, which is also secured through the flange 7ᵇ by means of bolts or other suitable fasteners so as to permit ready removal thereof to allow the truck to be used for other purposes.

While I describe the preferred embodiment of my invention in accordance with the patent statutes, yet it will be understood that various changes and modifications thereof will immediately suggest themselves to those skilled in the art without departing from the spirit of my invention, the scope of which is defined by the following claims.

Having thus described my invention, what I claim as new and desire to secure by Letters Patent is:—

1. A truck frame comprising a pair of spaced supports, a connecting member for said supports, journal bearings associated with said supports and connecting member and clamping means carried by said journal bearings for maintaining said supports and connecting member in a predetermined position.

2. A truck frame comprising a pair of spaced supports, each of said supports comprising a pair of spaced members, a connecting member for said supports and disposed between said spaced members, journal bearings associated with said supports and connecting member, and clamping means carried by said journal bearings for maintaining said supports and connecting member in assembled relation.

3. A truck frame comprising a pair of spaced supports, a connecting member for said supports, journal bearings extending through said supports and connecting member, and clamping means associated with said journal bearings for maintaining said supports and connecting member in assembled relation.

4. A truck frame comprising a pair of spaced supports, each of said supports comprising a pair of spaced members, a connecting member for said supports, said connecting member being disposed between said spaced members, journal bearings extending through said support and connecting member, and clamping means carried by said journal bearings for maintaining said supports and connecting member in assembled relation.

5. A truck frame comprising a pair of spaced supports, a connecting member for said supports, journal bearings extending through said supports and connecting member, said journal bearings having a shoulder adjacent one end thereof, and clamping means carried by said journal bearings for maintaining said supports and connecting member in assembled relation.

6. A truck frame comprising a pair of spaced supports, each of said supports comprising a pair of spaced members, an angle plate carried by said supports, between said spaced members, a connecting member carried by said support between said spaced members and in spaced relation to said angle plate, bearings extending through said supports and connecting member, and clamping means associated with said bearings for maintaining said supports and clamping member in assembled relation.

7. The combination with an aerial tramway truck comprising a frame; of a horizontally disposed bolster carried by said frame, a supporting plate carried by said frame in spaced relation thereto forming a support for said bolster, a receptacle frame supported upon the ends of said bolster, and a pivotal connection between said bolster and said supporting frame.

8. The combination with an aerial tramway truck comprising a frame having a laterally projecting base member; of a supporting member carried by said base member in spaced relation thereto, a bolster supported upon said supporting member adjacent said base member, said bolster comprising a channel bar, a wear plate having grooves for the reception of the longitudinal edges of said channel bar, a pivot bolt extending through said lateral base portion and said supporting member for horizontally pivoting said bolster to said truck, a receptacle frame carried by the ends of said bolster, and means for vertically pivoting said receptacle frame to said bolster.

9. The combination with an aerial tramway truck comprising a frame having a laterally projecting base member; of a supporting member carried by said base member in spaced relation thereto, a bolster supported upon said supporting member adjacent said base member, a pivot bolt extending through said lateral base portion and said supporting member for horizontally pivoting said bolster to said truck, a receptacle frame carried by the ends of said bolster, and means for vertically pivoting said receptacle frame to said bolster.

10. A truck frame comprising a pair of spaced supports, a connecting member for separably connecting said supports, and said supports and connecting member at the site of their connection having a bearing supporting portion, and fastening means for retaining said supports and connecting member in assembled relation.

In testimony whereof I affix my signature.

JOSEPH F. MONTINE.